Figure 1:
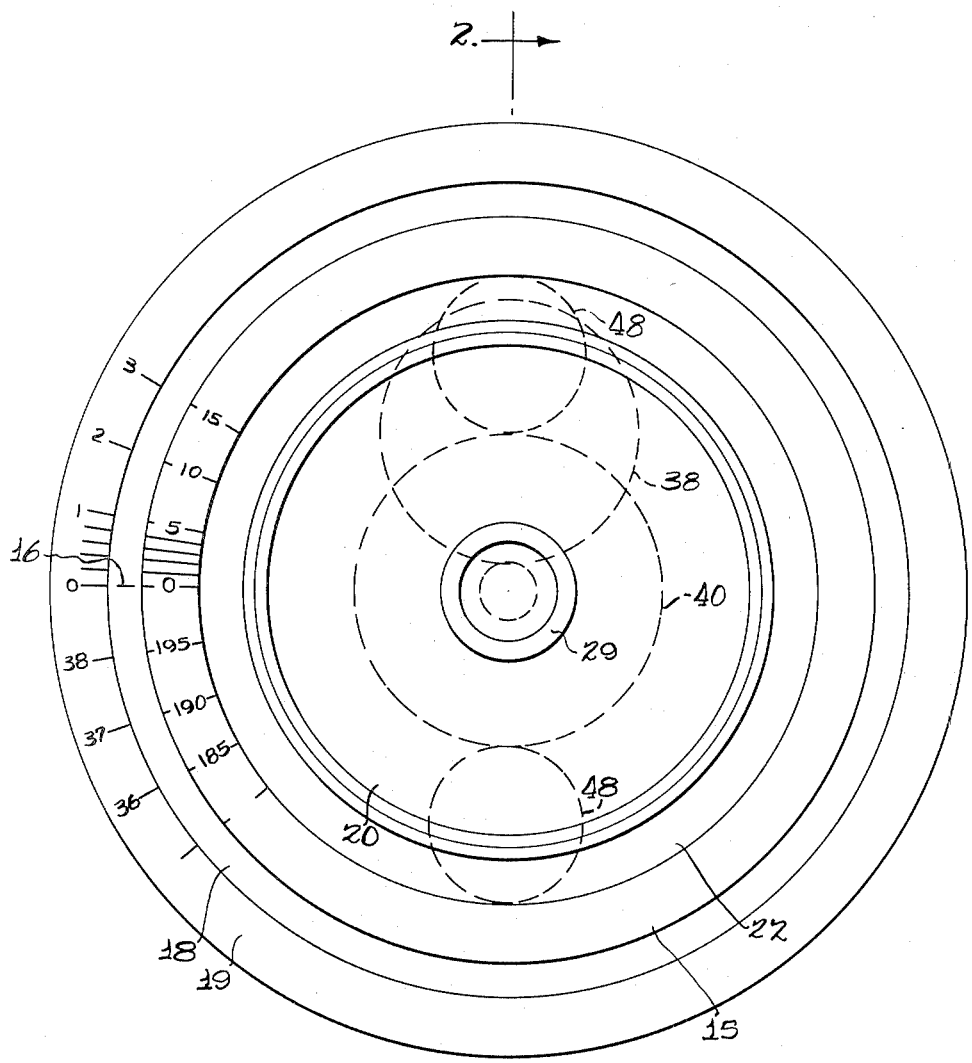

May 1, 1956 J. C. HOLLIS 2,743,699
DISPLACEMENT INDICATOR
Filed July 28, 1954 2 Sheets-Sheet 1

Inventor
John C. Hollis
by Carlson, Pitzner, Hubbard & Wolfe
Att'ys

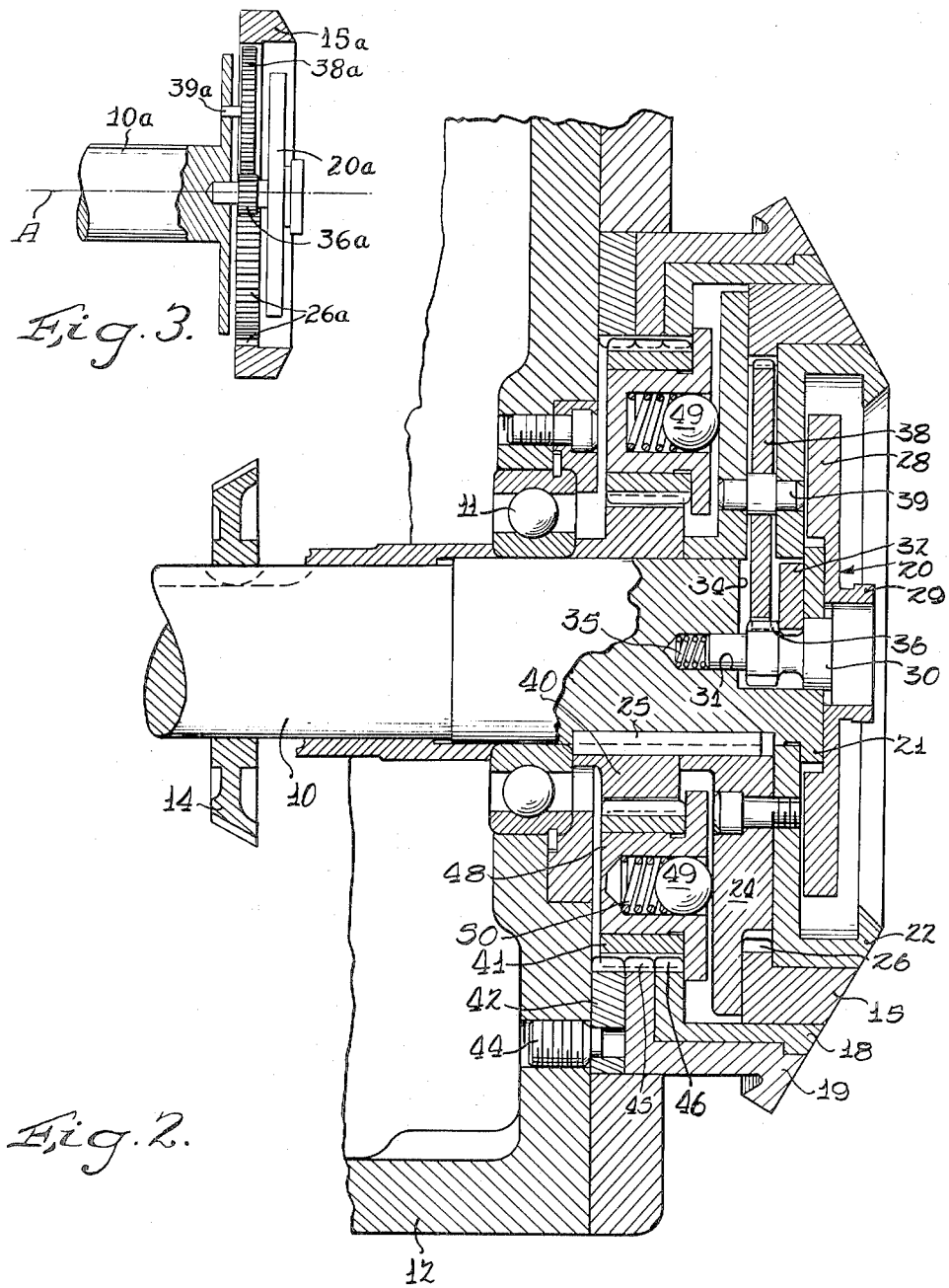

United States Patent Office 2,743,699
Patented May 1, 1956

2,743,699

DISPLACEMENT INDICATOR

John C. Hollis, Fond du Lac, Wis., assignor to Giddings & Lewis Machine Tool Company, Fond du Lac, Wis., a corporation of Wisconsin Application July 28, 1954, Serial No. 446,195

10 Claims. (Cl. 116—115)

This invention relates to indicators for measuring and showing the displacements, either linear or angular, of movable elements and finds, for example, one advantageous use as a micrometer indicator of the position of a translatable tool holder or work support in machine tools. More particularly, the invention relates to dial indicators having a concentric scale and vernier dial rotated in timed relation so that coarse and fine displacements may be observed.

The general aim of the invention is the provision of an improved indicator of the foregoing type which is compact and convenient to read, and in which the vernier dial may be quickly and easily indexed to any desired rotational setting relative to a rotatable shaft.

A more specific object of the invention is to provide in such an indicator, a dial rotatable either with or relative to a rotary shaft, selected rotational settings of the dial relative to the shaft being maintained notwithstanding inertia forces arising upon acceleration or deceleration of the shaft by means counterbalancing and neutralizing such inertia forces.

In this aspect, it is another object of the invention to provide an arrangement of general utility by which a first member, journalled for rotation relative to a second rotatable member, is held in fixed angular relation to such second member without the necessity of any mechanical clamps; yet in which the first member may be rotationally indexed or rotated relative to the second member. This obviates the releasing of clamps prior to, and the tightening of such clamps subsequent to, such rotation of the first member, as necessary in prior devices wherein the attendant possibility of disturbing the indexed positions was present.

A further object is the provision of such a displacement indicator in which a scale is rotated in timed relation to a vernier dial by differential gearing and in which a reference index member, concentrically disposed between the scale and dial to facilitate reading of both, is held stationary solely by engagement with such differential gearing.

Still another object is to provide such a displacement indicator which is economical and compact in construction, yet accurate and simple in use.

Other objects and advantages will become apparent as the following description proceeds, taken in conjunction with the accompanying drawings in which:

Figure 1 is a front elevation of a displacement indicator embodying the features of the invention; Fig. 2 is a sectional view of the indicator, taken substantially along the line 2—2 in Fig. 1; and Fig. 3 is a simplified diagrammatic illustration of a counterbalancing mechanism employed in the displacement indicator.

While the invention has been shown and is described in some detail with reference to a particular embodiment thereof, there is no intention that it thus be limited to such details. On the contrary, it is intended here to cover all alterations, modifications and equivalents falling within the spirit and scope of the invention as defined by the appended claims.

Referring now to the drawings, the exemplary displacement indicator here shown is intended for use in measuring or indicating either the linear displacement of a translatable member (not shown) or the angular displacement of a rotatable member (not shown). It includes a first member adapted to be rotated through angles proportional to the displacements of the movable member, such first member being here illustrated as a stub shaft 10 journaled by means of a suitable bearing 11 in a housing 12 (partially shown) of the equipment with which the indicator is employed. For imparting rotation to the stub shaft 10, it may be equipped at its inner end with a bevel gear 14 which may be drivingly engaged with a rotatable member. For measuring or indicating fine increments of displacement, the stub shaft 10 carries a second member or vernier dial 15 which is rotatable with the stub shaft yet angularly adjustable relative to it in order to afford manual setting or indexing of the dial. The dial 15 is scribed with suitable graduations which may be read opposite an index mark 16 on a stationary index member or ring 18. For indicating relatively coarse increments of displacement, a scale 19 is connected by means of differential gearing to be rotated in timed relation to the dial 15 and shaft 10, the scale also having graduation marks on a portion thereof which may be read opposite the index mark 16. From the foregoing it will be seen that the dial 15 is rotatably driven with the shaft 10 at a greater rate than the scale 19, so that the dial laps the scale much in the manner as the minute hand of a clock laps the hour hand.

It may be pointed out that indicators of this general type are commonly employed on machine tools to show the location and displacement of a feedable work-carrying or tool-carrying member, such as the saddle on a vertical turret lathe. In such machines, the saddle is linearly translatable by means of a feed screw which is rotatably driven by any suitable feed drive mechanism. The feed screw may carry a bevel gear (not shown) drivingly engaged with the gear 14 on the stub shaft 10 so that the latter shaft is rotated in proportion to linear displacement of the saddle. By way of illustration in the present case, the scale 19 is calibrated in inches between major graduations on its face and fifths of an inch between minor graduations, the total travel of the saddle being, say, thirty-nine inches. During a complete traverse of the saddle the scale makes approximately one complete revolution. Also, the vernier dial 15 may be calibrated in thousandths of an inch, having two hundred such calibration marks around its face so that the nearest one-fifth of an inch may be read from the scale 19 and the nearest thousandths of an inch then read from the dial 15. While the indicator shown has been described by way of example as measuring and indicating the linear displacement of a machine tool element, it will be understood that with the calibration on the scale 19 and dial 15 changed, such an indicator may also be employed to show total and incremental revolutions of a rotatable member.

In displacement indicators of the type described it is often necessary to translate the movable element a predetermined distance from any position. While it is possible to read the scale and dial and add or subtract such distance from the initial reading in order to determine what the final reading should be, the dial 15 is preferably rotatable relative to the shaft 10 so that it may be indexed to zero and the new displacement read directly.

Heretofore, after such indexing, it has been necessary to mechanically clamp the dial to the stub shaft 10 in order to prevent relative rotation of the two due to inertia forces on the dial arising as the stub shaft 10 is subjected to acceleration or deceleration. The use of such mechanical clamping means involved not only a complex and initially expensive mechanism, but further created the problem of assuring that the indexed settings of the dial relative to the shaft were not disturbed when the clamping means were loosened or tightened.

It is to the total elimination of this difficulty that the present invention is directed.

In accordance with one feature of the invention, means are provided for mounting the dial 15 for rotation either with or relative to the shaft 10 about a common axis, such means preventing the shifting of the dial relative to the shaft under the influence of inertia forces, yet permitting the dial to be manually indexed relative to the shaft, all without the necessity of mechanical clamping means. In carrying out the invention, a counterweight member 20 is journaled for rotation relative to the shaft 10 and connected by gear means to rotate the dial 15 in one direction when the counterweight is rotated in the opposite direction relative to the shaft 10. Such gear means include at least one gear which is bodily supported by the shaft 10 at a point eccentrically or radially displaced from the common axis of rotation. As here shown, the shaft 10 is formed with an end flange 21 against which a ring 22 and a flange 24 bear in an axial direction, the latter two being rigidly locked to the shaft by a key 25. The dial 15 is made annular in shape and journaled concentrically around the ring 22, presenting its calibrated face to clear view. The rear edge of the dial 15 is formed with an internal gear 26 to cooperate with the counterweight member 20 in the manner described below.

The counterweight member 20, in this instance, includes a disk 28 having a central knob portion 29 rigidly mounted on a shaft portion 30 which is journaled within a coaxial recess 31 defined in the outer end of the shaft 10. The shaft portion 30 is held in axial position by means of a crescent key 32 inserted through a radial slot 34 in the shaft 10, the shaft portion 30 being biased against the key 32 by a compression spring 35 disposed at the inner end of the recess 31. A pinion 36 is formed integrally on the shaft portion 30 for a purpose explained below.

For connecting the dial 15 and counterweight 20 to rotate in opposite directions relative to the shaft 10, the gear means include an idler gear 38 journaled on a pin 39 supported by the shaft 10 at a point spaced eccentrically from the axis of the latter. As shown, the pin 39 is carried between the flange 24 and the ring 22 which are fast on the shaft 10 and thus form a part thereof, the gear 38 being meshed with the pinion 36 and the internal gear 26 on the dial 15. To index the dial 15 relative to the shaft 10, therefore, it is only necessary for an operator to grasp the knob portion 29 and manually turn the same in either direction. As a result, the dial 15 is driven in the opposite direction through the pinion 36, idler gear 38 and internal gear teeth 26. By virtue of the mechanical advantage afforded by the idler gear connection the dial 15 is rotated at a much slower rate than the counterweight 20 so that it is possible to set accurately any selected one of the dial calibration marks opposite the index mark 16.

In order to prevent rotation of the dial 15 relative to the shaft 10 as the latter is subjected to rotational acceleration, the moments of inertia of the dial 15 and the counterweight 20 are proportioned in the same ratio as the mechanical advantage afforded by the gearing connection therebetween. That is, the disk 28 is formed and weighted with the other parts of the counterweight member 20 so that the moments of inertia of the latter when multiplied by the mechanical advantage of the gearing connection afforded by the pinion 36, idler gear 38 and dial gear 26 is equal to the moment of inertia of the dial 15. For example, if the dial 15 has a moment of inertia ten times that of the counterweight 20, the gearing is so arranged as to produce a mechanical advantage of 10 in favor of the counterweight. In the present instance, that would mean that dial gear 26 would have ten times as many teeth as the pinion 36. On the other hand, if the dial 15 and counterweight 20 had equal moments of inertia, the gearing connection between them would be chosen to provide a mechanical advantage of 1. Finally, if the dial 15 has a smaller moment of inertia than that of the counterweight, then the gearing would be chosen to provide a mechanical advantage equal to the ratios of those moments of inertia but in favor of the dial, i. e., such that a given torque on the dial causes the gearing to exert a greater torque in the opposite direction on the counterweight. When the shaft 10 is subjected to acceleration or deceleration, both the dial 15 and counterweight 20 will tend to rotate in the same direction relative to the shaft 10 due to inertia forces. However, because the idler gear 38 tends to drive the dial and counterweight in opposite directions, the inertia forces oppose and counterbalance on another. Thus, without any clamping means whatever, both the dial 15 and counterweight 20 are held stationary relative to the shaft 10.

The index 18 is annular in shape and concentrically supported in slidable relation around the dial 15. The scale 19 is also annular and, in turn, concentrically disposed in slidable relation around the index ring 18. Thus, the ring 22, dial 15, index ring 18, and the scale 19 are all disposed in concentrically nested relation as shown. For driving the scale 19 in timed relation to the dial 15 and shaft 10, in this case, at a greatly reduced rate, differential gearing is operatively connected between the shaft 10 and the scale 19. The problem arises, however, of holding the index ring 18 absolutely stationary. It is highly desirable that the index ring be concentrically disposed between the scale 19 and dial 15 in order that the graduations of the latter two may be read directly opposite the index mark 16. But, in such case, there is little possibility, short of bulky or expensive arrangements, of anchoring the index ring fast to the housing 12.

In accordance with another aspect of the invention, means are provided in the displacement indicator not only for driving the dial 15 and scale 19 in timed relation, but also for holding the index ring 18 stationary, solely through engagement of the latter with the differential gearing employed.

As here shown, the differential gearing includes a sun gear 40 fast on the shaft 10 (and therefore rotatable with the dial 15), the gear 40 being secured against rotation relative to the shaft by the key 25. A plurality of floating pinions 41 are disposed in meshed relation around the sun gear 40 and meshed with a stationary internal ring gear 42 held fast on the housing 12 by suitable pins 44 threaded into the housing and projecting into matched openings in the gear 42. The scale 19 is formed at its inner edge with an internal scale gear 45 which is also meshed with the floating pinions 41, being disposed axially alongside of the stationary gear 42. The scale gear 45 is formed with a different number of teeth than the stationary gear 42, so that for each revolution of the sun pinion 40, the scale 19 is rotated through an angle equal to the angular extent of the extra teeth on either the scale or the stationary gear. In the arrangement illustrated, the scale gear 45 may have two more teeth than the stationary gear 42, the angular position of its two extra teeth being equal to one minor calibration on the scale face. Therefore, for each revolution of the vernier dial 15, the scale will rotate through one minor graduation increment, indicative of $1/5$ of an inch. A very great reduction ratio is thus obtained for driving the scale 19 in timed relation to the dial 15.

For holding the index ring 18 stationary, it is formed at its inner edge with an internal ring gear 46 which is also meshed with the floating pinions 41, being disposed axially alongside the scale gear 45. The index ring gear 46 is provided with exactly the same number of teeth as the stationary gear 42. As a result, when the scale 19 is rotatably driven, the index ring 18 cannot move. Rather, it is held absolutely stationary although not anchored to the housing 12 and restrained only by its engagement with the pinions 41.

The entire assembly as thus described may be held in place by spring means. For this purpose, flanged cup members 48 are inserted in each of the floating pinions 41, the lattter being annular in form. Balls 49 are disposed in the cup members and biased against the flange 24 by compression springs 50. As a result, the flange 24 and ring 22 are biased axially to the left (Fig. 2) against the integral shaft flange 21. At the same time, the flanges of the cup members 48 bear against the index ring 18 biasing the latter, as well as the scale 19, axially to the left against the face of the stationary gear 42. The floating pinions 41 are thus held axially in engagement with the stationary gear 42, and the integral scale and index ring gears 45 and 46 are held axially in meshing engagement with the floating pinions.

By way of understanding the novel concept and operation of the counterbalancing arrangement, which as previously indicated is of general utility, it will be helpful to consider briefly the diagrammatic representation shown in Fig. 3 where parts corresponding to those in Fig. 2 are represented by like reference numerals to which the distinguishing suffix "a" has been added. As illustrated in Fig. 3, first and second members 15a and 10a, as well as a counterweight member 20a, are journaled for independent rotation about a common axis A. Reversing gear means are interposed between the counterweight member 20a and the first member 15a, and include at least one gear 38a bodily supported by the second member 10a at a point eccentric of the axis A. In the present instance the gear 38a is journaled on a pin 39a pressed into an integral flange of the second member 10a. The reversing gearing further includes gears 26a and 36a on the first member 15a and the counterweight member 20a. As explained previously, the moments of inertia of the counterweight member 20a and the first member 15a are proportioned in the same ratio as the mechanical advantage afforded by the reversing gearing 26a, 38a, 36a.

To rotate the first member 15a relative to the second member 10a and thus adjust their angular relationship, it is only necessary to turn the counterweight member 20a whereupon the first member is rotationally driven in the opposite direction through the reversing gearing. Alternatively, the first member 15a may itself be turned, the counterweight member rotating freely in the opposite direction because of the connection through the reversing gearing.

When the second member 10a is rotationally driven and subjected to acceleration and deceleration upon starting and stopping, the first member 15a is prevented from rotating relative to the second member. For example, when the second member 10a is rotationally accelerated, the first member 15a would normally tend to remain stationary due to its inerita. That would tend to cause the gear 38a to rotate about its own axis and to roll around the gear 26a. However, the gear 38a cannot rotate about its own axis due to the fact that it is meshed with the gear 36a on the counterweight member 20a which, owing to its inertia, also tends to remain stationary. Since the gears 26a and 36a thus exert equal and opposite torques on the gear 38a, the latter serves as a rigid link between the three members 10, 15a, and 20a and all three must rotate in unison without shifting relative to one another. The "phasing" of the member 15a relative to the second member 10a is maintained constant as the latter is subjected to acceleration, and without the requirement of mechanical clamps. Yet the "phasing" of the first member 15a relative to the second member 10a may be adjusted, as desired, at any time.

From the foregoing, the operation of the exemplary displacement indicator illustrated in Figs. 1 and 2 is believed to be clear. By way of brief summary, it may be observed that rotation of the shaft 10 serves to carry the vernier dial 15 with it so that positions of the shaft may be readily observed by referring to the graduation marks on the dial opposite the index mark 16 on the stationary index ring 18. By virtue of the differential gearing described, the scale 19 is rotated in timed relation, at a greatly reduced rate, to the dial 15 so that relatively great increments of displacement may be read from the graduation marks on the scale face opposite the index mark 16. Because the scale gear 45 has a different number of teeth than the stationary gear 42, the scale is driven at a greatly reduced rate. Yet, because the gear 46 on the index ring 18 has exactly the same number of teeth as the stationary gear 42, the index ring is held absolutely stationary. This permits the index ring 18 to be concentrically disposed between the scale 19 and dial 15. Graduations on both the scale and dial may therefore be read directly opposite the index mark 16. The arrangement is extremely compact because it is not necessary to anchor the index ring 18 directly to the housing 12 in order to hold it stationary.

To adjust the angular position of the dial 15 relative to the shaft 10, it is only necessary to turn the counterweight member 20 by grasping the knob 29. This results in the dial being turned in the opposite direction at a greatly reduced rate relative to the shaft 10 by virtue of the reversing connection provided by the idler gear 38. At any time, therefore, the position of the dial 15 may be accurately adjusted relative to the index mark 16 to provide a new reference. Because the moments of inertia of the counterweight 20 and dial 15 are balanced through the idler gear connection, it is not necessary to mechanically clamp the dial 15 to the shaft 10 as the latter is subjected to acceleration or deceleration. The dial is held absolutely fixed in rotational position relative to the shaft because the inertia forces or torques arising in the same direction on the counterweight 20 and dial 15 balance and cancel one another through the reverse gearing connection afforded by the idler gear 38.

I claim as my invention:

1. A dial-type displacement indicator comprising, in combination, a shaft rotatable through angles proportional to displacements of a movable member, a dial and a counterweight journaled for rotation relative to said shaft, gear means connecting said dial to rotate in one direction when said counterweight is turned in the opposite direction relative to said shaft to thereby permit indexing of the dial, the moments of inertia of said dial and counterweight being proportioned in the same ratio as the mechanical advantage afforded by said gear means, an index ring carried by said dial and rotatable relative thereto, a scale journaled by said index ring and rotatable relative to the latter, differential gear means interconnecting said shaft and scale to rotate in timed relation, gearing on said index ring, said differential gear means including means meshing with the gearing on said index ring to hold the latter stationary as said scale and dial rotate relative thereto.

2. A clock-type displacement indicator comprising, in combination, a shaft rotatable proportionally to the displacement of a movable member, a ring fast on said shaft, an annular vernier dial concentrically journaled on said ring, a counterweight journaled on said shaft, gear means including gear operatively connected between said dial and counterweight to turn the former when the latter is rotated in the opposite direction relative to said shaft, the moments of inertia of said dial and counterweight being related in value in the same portion as the mechanical advantage afforded by said gear means, whereby inertia forces on the dial and counterweight counterbalance to leave them stationary relative to said shaft as the latter is subjected to angular acceleration, a sun gear on said shaft, a plurality of floating pinions meshed with said sun gear, an annular index ring journaled on said dial and having an internal gear meshed with said floating pinions, an annular scale journaled on said index ring and having an internal gear meshed with said floating pinions, and a stationary internal ring gear meshed with said pinions, said stationary gear having the same number of teeth as said index ring gear but at least one tooth less than said scale gear, whereby said scale is rotated in timed relation with said vernier dial and the index ring interposed between them remains stationary.

3. In a displacement indicator device, the combination with a shaft rotatable through angles proportional to the displacements of a movable member, of an indexable dial journaled for rotation relative to the shaft, a counterweight member also journaled for rotation relative to the shaft, means interconnecting said dial and member such that rotation of the latter turns the former in an opposite direction relative to the shaft, the dial and counterweight member having their moments of inertia balanced in proportion to the mechanical advantages afforded by said interconnecting means, whereby inertia forces on the dial and counterweight member cancel each other to hold them stationary relative to the shaft as the latter is subjected to angular acceleration and deceleration.

4. In a micrometer indicator, the combination of a rotatable shaft, a stationary index member, an indexable vernier dial journaled for rotation relative to said shaft, a manually rotatable member journaled for rotation relative to said shaft and including a counterweight portion, gear means including an idler gear operatively connected between said dial and said rotatable member such that manual rotation of the latter turns the dial in an opposite direction relative to said shaft with a predetermined mechanical advantage to thereby permit indexing adjustments of the dial, the moments of inertia of said dial and rotatable member being equal when one is multiplied by the mechanical advantage afforded by said gear means, whereby inertia forces on said dial and member counterbalance and the dial and member remain stationary relative to the shaft when the latter is subjected to rotational acceleration and deceleration.

5. In a displacement indicator, the combination of a shaft rotatable through angles proportional to the displacements of a movable member; a ring fixed to said shaft; an annular dial journaled on said ring for rotation relative to said shaft and having an internal gear therearound; a counterweight member having a shaft portion coaxially journaled in the end of said shaft and a pinion on said shaft portion, there being a radial slot in said shaft communicating with said pinion, an idler gear journaled on said ring and meshed with said internal gear and said pinion to thereby impart rotation in a first direction to said dial when said counterweight member is turned in the opposite direction relative to said shaft, the moments of inertia of said dial and counterweight member being balanced through said idler gear whereby the dial and counterweight member remain stationary relative to the shaft when the latter is subjected to angular acceleration and deceleration.

6. In a micrometer dial-type displacement indicator the combination comprising a stationary support, an annular scale, index member, and dial concentrically nested in the order named and journaled for rotation relative to said support and relative to each other, means including differential gearing connecting said dial and scale for rotation in differentially timed relation, said gearing including a gear held stationary by attachment to said support, and a gear portion on said index member having the same number of teeth as said stationary gear and meshed with said differential gearing to thereby hold the index member stationary as said scale and dial rotate relative thereto.

7. In a clock-type displacement indicator, the combination of an annular scale, an index member, and a vernier dial all disposed in concentrically nested relation; a shaft rotatable with said dial; differential gearing connected between said shaft and scale to rotate the same in differentially timed relation, said gearing including a sun gear on said shaft, a plurality of floating pinions meshed therewith, a stationary internal ring gear meshed with said floating pinions, and an internal ring gear portion on said scale meshed with said floating pinions and having a different number of teeth than said stationary gear, and an internal ring gear portion on said index member meshed with said floating pinions and having the same number of teeth as said stationary gear, whereby said index member is maintained stationary although rotationally constrained only by its engagement with said floating pinions.

8. In a clock-type displacement indicator, the combination of a shaft rotatable in proportion to the displacement of a movable member, a circular vernier dial mounted to rotate with said shaft, an annular index member disposed in concentric relation around said dial and rotatable relative thereto, an annular scale disposed in concentric relation around said index member and rotatable relative thereto, differential gearing connecting said scale to be rotated at a slower rate but in the same direction in response to rotation of said shaft, said gearing including a sun gear on said shaft, a plurality of floating pinions meshed with said sun gear, a stationary internal ring gear surroundingly meshed with said floating pinions, an internal ring gear on said scale meshed with said floating pinions and having at least one more tooth than said stationary gear, and an internal ring gear on said index member meshed with said floating pinions and having the same number of teeth as said stationary gear to thereby hold said index member stationary as said scale and dial are rotated relative thereto.

9. For use with first and second members journaled for rotation about a common axis, a mechanism for preventing rotation of the first member relative to the second member comprising, in combination, a counterweight member journaled for rotation about the common axis, gear means interconnecting the first member and said counterweight member for causing rotation of one in the opposite direction when the other is rotated relative to the second member, said gear means including at least one gear bodily supported upon the second member at a point radially displaced from the common axis, said counterweight member having a moment of inertia proportioned to the moment of inertia of the first member in the same ratio as the mechanical advantage afforded by said gear means.

10. In combination with first and second members individually rotatable about a common axis, means for preventing rotation of the first member relative to the second member upon rotational acceleration of the latter, said means including a counterweight member individually rotatable about said common axis, reversing gear means operatively connecting said first member and said counterweight member such that rotation of one relative to said second member causes rotation of the other in the opposite direction relative to said second member, said gear means including at least one gear bodily supported by said second member at a point eccentrically located from said axis, the moments of inertia of said counterweight member and said first member being proportioned in the same ratio as the mechanical advantage afforded by said gear means, whereby said first member must rotate in unison with said second member when torque is externally applied to the latter, but said first member may be rotated relative to said second member when torque is externally applied to the former.

References Cited in the file of this patent

UNITED STATES PATENTS 2,572,361     Luning                Oct. 23, 1951